Nov. 26, 1929.  J. W. HOOLEY  1,737,242
THREADLESS COUPLING
Filed Sept. 5, 1928
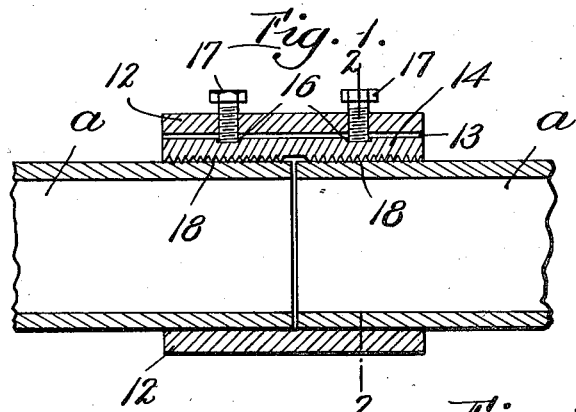
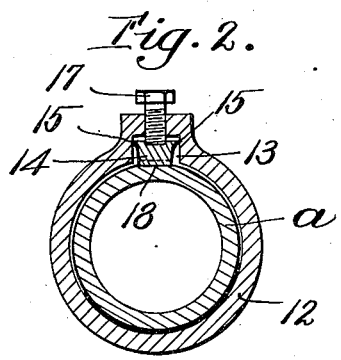
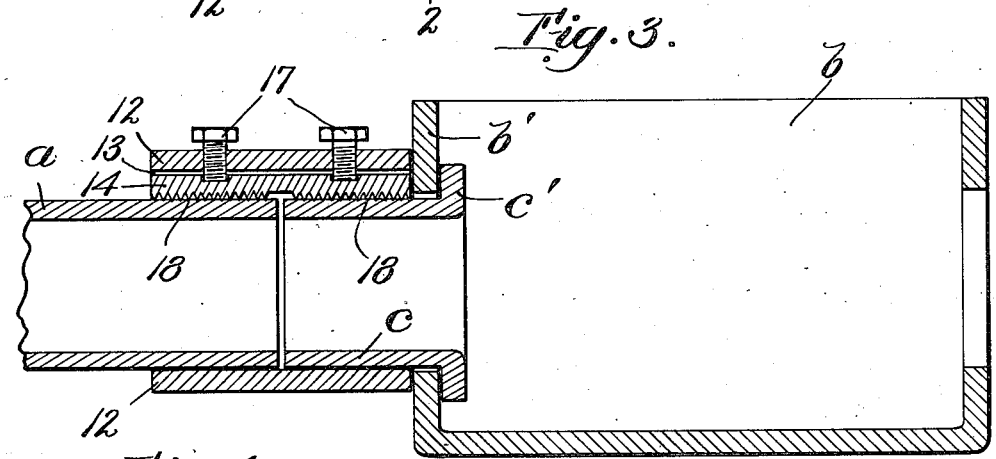
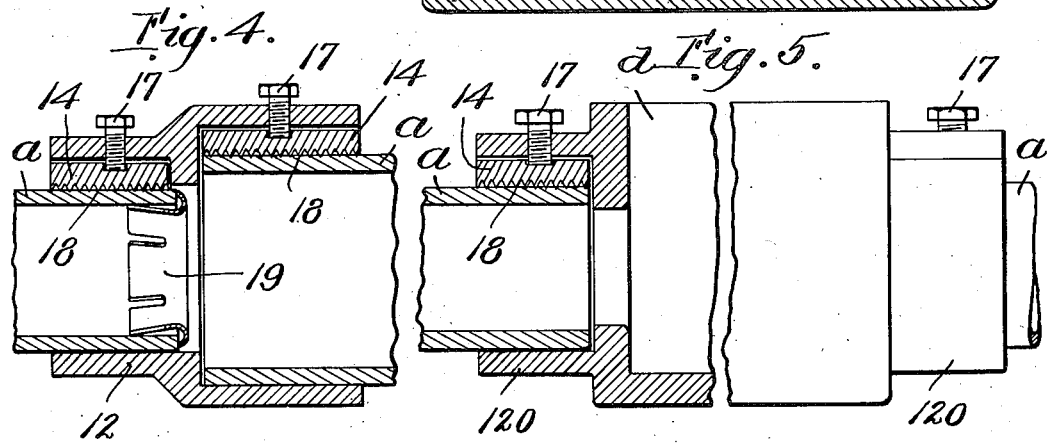
Inventor:
John W. Hooley
by A. W. Harrison
Atty.

Patented Nov. 26, 1929

1,737,242

UNITED STATES PATENT OFFICE

JOHN W. HOOLEY, OF LARCHMONT, NEW YORK

THREADLESS COUPLING

Application filed September 5, 1928. Serial No. 304,038.

This invention relates to means for connecting cylindrical articles such as pipes, conduits or rods, either by coupling them together end to end or to other objects, and the invention has particular reference to means for effecting a tight joint without providing the pipes, conduits or rods with any screw threads. For the sake of brevity and not for limitation, the threadless cylindrical articles will be hereinafter referred to as conduits because the invention is especially useful in connection wth the installation of electric wires.

It is frequently desirable, especially in the installation of conduits for electric wiring, to mount or secure the conduits in position without requiring that any rotative or longitudinal movement shall be imparted to them when they are joined to other conduits or to other fittings. Therefore one of the objects of the present invention is to provide an improved coupling which effects a secure grip on a conduit which is externally smooth or has no screw threads, the joining to another conduit or to some fitting being effected without imparting any movement to the conduit itself after locating it in the position which it is to occupy.

Another object is to provide a threadless joint or coupling which is simple, positive in its action, and very economical in manufacture.

Another object is to provide a joint or coupling the members of which will remain in proper assembled relationship, ready for use when wanted for installation, and yet without having any threaded connections to hold them together, or requiring any packaging.

With the above objects in view, the invention consists in the construction and combination of parts substantially as hereinafter described and claimed.

Of the accompanying drawings:—

Figure 1 is a longitudinal sectional view of one form of my improved joint or coupling.

Figure 2 represents a section on line 2—2 of Figure 1.

Figures 3, 4 and 5 are longitudinal sectional views illustrating the invention as applied to some of the other uses to which it may be applied.

Similar reference characters designate similar parts or features in all of the views.

Referring first to Figures 1 and 2, two conduit sections $a$ $a$, which may be galvanized or painted but have no screw threads and consequently present no fresh-cut surfaces for the action of acids, alkalis, atmospheric or other deleterious substances, are joined end to end by my improved coupling comprising a sleeve 12 having a smooth interior which is preferably cylindrical in form except for a longitudinal recess 13 for the strip 14 hereinafter referred to as the key. Said key is preferably, but not necessarily for all purposes, of hard metal, and so fits the recess 13 as to remain there when inserted. In the specific embodiment illustrated, the key has laterally projecting teeth or ridges 15 (Fig. 2) which so engage the walls of the recess 13 that the key will remain in the recess when the coupling is stored or is being handled preparatory to installation. Preferably the fit of the key in the recess is so close or tight that some pressure is required to force it to place when the sleeve and key are first assembled.

In the upper surface of the key 14 are shallow recesses 16 to provide convenient seats for the ends of screws 17 which project through threaded holes in the sleeve and therefore prevent relative longitudinal movement of the sleeve and key when the coupling is in use.

The inner surface of the key is formed to firmly engage the surfaces of the conduits $a$, and to this end the key is preferably of hard metal and its inner or under surface is toothed as at 18 to bite into the conduit.

When installation is to be effected, the conduits $a$, $a$, are simply fitted end to end in the sleeve and the screws 17 are actuated to force the key 14 inwardly until its inner surface so binds against the conduits as to prevent them from parting. Of course if occasion or particular use requires it, a suitable washer or other packing can be employed between the abutting ends of the conduits.

Owing to the fact that the ends of the coupling are exposed to view, it will be possible to see the cutting effect of the teeth of the key on or into the surface of the conduits.

Figures 3, 4 and 5 represent embodiments of the invention for uses other than coupling two conduits of the same size directly together end to end. Figure 3 illustrates the coupling as connecting a conduit $a$ to a wall member which, in said figure, is the wall $b'$ of an outlet box $b$. For this purpose a tubular bushing $c$ is employed, extending through a hole in the wall $b'$ and having a flange $c'$ at its inner end. When the coupling with its bushing $c$ and the conduit are assembled with the wall $b'$, the flange $c'$ and the inner end of the coupling sleeve are caused to so engage opposite surfaces of the wall around the hole therein as to firmly grip said wall. In this embodiment of the invention, the bushing is conduit-shaped and of substantially the same diameter as the conduit $a$, and is practically a part of the coupling since it serves, with the other members, to connect the conduit $a$ with the wall $b'$. Of course the key 14 extends beyond the end of the bushing so that the one key binds both the bushing and the conduit.

Figure 4 illustrates a modified form of coupling for joining two conduits $a, a$, one of which is larger than the other. Therefore the sleeve 12 is also larger at one end than at the other end, and a key 14 is located in a recess in each portion of the sleeve and each key is forced into biting or binding engagement with a conduit by a screw 17. With this form it is desirable to employ a guard or protector 19 on the end of the smaller conduit so that wires passing will not be cut or worn by the more or less sharp angle at the end of said conduit. With the form shown in Figure 4, the coupling can be shifted along relatively to the length of the smaller conduit, and caused to grip said conduit if conditions of installation call for such adjustment, in which case the smaller conduit will project more or less into the larger conduit.

Figure 5 illustrates two conduits $a, a$, coupled to opposite wall portions of a special junction fitting $d$, said wall portions being formed with extensions 120 which are similar to, and possess the same functions as, the sleeve 12 of the other Figures.

Each embodiment of the invention illustrated includes a key member carried by a sleeve member and is provided with means, such as screws, by which the inner surface of the key member is caused to grip the surface of a conduit extending into the sleeve member.

I do not limit myself to employing but a single key member which acts on a conduit in but one location thereof as illustrated by Figure 2. Obviously, and without necessitating illustration, the sleeve member of either form of the invention illustrated may have a plurality of recesses in different locations of its interior, with a binding key in each of said recesses.

Having now described my invention, I claim:—

1. A conduit coupling comprising a sleeve having a recess in its inner surface, and a conduit-locking key mounted in said recess and bodily movable therein, the said recess and key being of relative formations to interengage to retain the key in the recess when the coupling is not in use.

2. A conduit coupling comprising a sleeve having a recess in its inner surface and longitudinally thereof, a key member mounted in said recess and freely movable therein, said key member having a straight transversely toothed inner surface and provided with side ridges engaging the walls of said recess, and means for forcing said key member inwardly.

3. A coupling for uniting a conduit with an apertured portion of a wall, comprising a conduit-shaped bushing having a flange to engage the inner surface of such wall around its aperture, a sleeve having a longitudinally extending recess in its inner surface, a key member bodily movable in said recess, said sleeve and key member being proportioned to engage the outside of said bushing and to extend beyond the end thereof, and means for forcing said key member into gripping engagement with said bushing and with a conduit abutting the said bushing.

In testimony whereof I have affixed my signature.

JOHN W. HOOLEY.